United States Patent
Grieser

(10) Patent No.: US 8,376,283 B2
(45) Date of Patent: Feb. 19, 2013

(54) DEVICE FOR SWITCHABLE PILOT CONTROL FORCES

(75) Inventor: Wolfram Grieser, Riemerling (DE)

(73) Assignee: Eurocopter Deutschland, GmbH, Donawoerth (DE)

( * ) Notice: Subject to any disclaimer, the term of this patent is extended or adjusted under 35 U.S.C. 154(b) by 301 days.

(21) Appl. No.: 12/620,893

(22) Filed: Nov. 18, 2009

(65) Prior Publication Data

US 2010/0123045 A1   May 20, 2010

(30) Foreign Application Priority Data

Nov. 19, 2008   (DE) .................... 20 2008 015 384 U

(51) Int. Cl.
*G05D 1/10* (2006.01)
(52) U.S. Cl. ..................................... 244/178; 244/76 R
(58) Field of Classification Search ............... 244/99.14, 244/99.2, 99.3, 99.4, 220, 223, 227, 228, 244/234, 76 R
See application file for complete search history.

(56) References Cited

U.S. PATENT DOCUMENTS

| | | | | | |
|---|---|---|---|---|---|
| 4,580,223 | A | * | 4/1986 | Wright et al. | 701/12 |
| 4,626,998 | A | * | 12/1986 | Adams et al. | 701/4 |
| 7,890,222 | B1 | * | 2/2011 | Shultz et al. | 701/3 |
| 8,002,220 | B2 | * | 8/2011 | Wilkens | 244/223 |

OTHER PUBLICATIONS

AAIB Bulletin, Eurocopter EC135T1 G-SPAU, Aug. 2003, pp. 5 and 6.*

* cited by examiner

*Primary Examiner* — Christopher P Ellis
*Assistant Examiner* — Medhat Badawi
(74) *Attorney, Agent, or Firm* — Brooks Kushman P.C.

(57) ABSTRACT

A device for controlling vehicles having a manual control unit configured to influence the direction of movement of a vehicle. The manual control unit provides, in a neutral position of the manual control unit, a trim point to determine a preferred direction of movement. The device further includes a force generating device, generating at least one force acting in the direction of the neutral position of the manual control unit; a trim coupling operable to reduce the at least one force acting on the manual control unit; and a trim control unit configured to store and retain the trim point existing prior to an operation of the trim coupling.

20 Claims, 1 Drawing Sheet

DEVICE FOR SWITCHABLE PILOT CONTROL FORCES

Priority is claimed to German Application No. DE 20 2008 015 384.0, filed on Nov. 19, 2008, the entire disclosure of which is incorporated by reference herein.

The invention relates to a device for controlling vehicles, for example aircraft or water craft. In particular the invention relates to improvements in the robustness of control systems in aircraft to unintended pilot intervention while maintaining direct intervention options of the pilot.

The following details are illustrated using the example of an aircraft, but they can analogously be used for any vehicle in which control of control surfaces or rudders within flows takes place, e.g. water craft.

In aircraft featuring servo-assisted controls, a so-called artificial feeling of force is common, with artificial breakout forces that are preferably constant, and with any additional artificial force gradient for convenient control by the pilot. These artificial forces, i.e. the artificial breakout forces and the additional optional artificial force gradients, should be relatively moderate so as to make it possible for pilots to sensitively control their craft. The trim point at which the artificial feeling of force becomes noticeable to the pilot is slidable within a defined control range by means of a trim coupling and/or a trim motor.

BACKGROUND

If a flight controller or an autopilot (Automatic Flight Control System, AFCS) is used, these artificial breakout forces are used to support the input of AFCS actuator signals into the aircraft control system. The forces that can be applied to the control system by such an autopilot are thus limited by these artificial breakout forces of the control system.

Overcoming the artificial breakout force or movement in the region of the force gradient is generally assessed by the AFCS computer as being an intended intervention by the pilot in the control, and thus results in temporary degradation of the AFCS operating mode in order to prevent the pilot and the AFCS from working against each other. Depending on the type of aircraft and the current flight situation, degradation of the AFCS operating mode can take place to a different extent in this arrangement. For example complete degradation of the autopilot is imaginable so that control of the aircraft takes place exclusively as a result of the manual control intervention of the pilot. However, partial degradation of the autopilot is also imaginable, in which the aircraft continues to be stabilised by the autopilot, while the pilot with manual control intervention handles the coarse control input, for example the flight direction.

This design is associated with an advantage in that it provides the pilot with a direct intervention option in the control and in unequivocal automatic degradation of the AFCS operating mode in favour of manual control by the pilot. Consequently situations can be prevented in which the AFCS and the pilot unintentionally work against each other, which might otherwise lead to critical flight situations. However, such a direct intervention option for the pilot requires moderate breakout forces in order to make comfortable manual control possible. The entire breakout forces are composed of the component friction in the control system and the additional artificial breakout forces to support the autopilot. Since the entire breakout forces are to be overcome by the pilot, there is a disadvantage in that in the case of substantial undesirable component friction it is only possible to select slight artificial breakout forces to support the autopilot, and consequently this result in high sensitivity of the system to any unintended intervention by the pilot. This can result in unintended bumping against the control device, or unintended fixing of the control device by the pilot possibly resulting in degradation of the autopilot, without this being intended and/or noticed by the pilot. Furthermore, as has already been mentioned, slight artificial breakout forces also limit the forces that can be exerted on the control system by the autopilot in the AFCS mode.

In other designs the AFCS remains active until such time as it is degraded by the pilot with the use of a switch or a contact sensor on the control device. This design advantageously results in improved robustness to unintended pilot intervention, but this advantage is counterbalanced by a disadvantage in that the absence of automatic degradation during pilot intervention, which as has already been mentioned may lead to critical flight situations. Activating the switch or the contact sensor on the control device generally results in decoupling of the trim coupling, as a result of which a trim motor, by way of which the AFCS intervenes in the control system, is decoupled from the control system. Such decoupling generally also results in a reduction in the breakout forces, e.g. by partial or complete decoupling of the artificial breakout forces. The pilot is then in a position to carry out manual control of the aircraft with reduced breakout forces. Furthermore, it is possible to use increased artificial breakout forces in the AFCS mode and thus to increase the range of forces for the autopilot because manual control by the pilot takes place with partial or complete decoupling of these artificial breakout forces. However, decoupling of the trim motor generally also results in the loss of the original trim point, which is often perceived by the pilot as being disagreeable because after termination of manual intervention the trim point has to be set anew.

Furthermore, combined embodiments exist in which degradation of the autopilot can take place both by way of direct intervention by the pilot in the control system by overcoming the entire breakout forces and by activation of a switch or of a contact sensor on the control device. These embodiments are, however, also associated with the already mentioned disadvantages in that the artificial breakout forces that are available to the autopilot for acting on the control system need to be moderate in order to make manual intervention by the pilot possible, and in that during decoupling of the trim coupling the trim point is lost.

SUMMARY OF THE INVENTION

The present invention solves the problems mentioned and discloses a device for the control of aircraft and water craft, which device provides a high degree of robustness to unintended pilot intervention, and allows very considerable scope of forces for the action of the autopilot. Furthermore, any manual intervention in the control system by the pilot at acceptable breakout forces continues to be ensured. Finally, the invention makes it possible to maintain a pre-set trim point even after manual control has been carried out.

The invention relates to a device for controlling vehicles that comprises a manual control unit which makes it possible to influence the direction of movement of a vehicle. Depending on the vehicle type, the manual control unit can, for example, be a control stick, a control column, a sidestick, pedals, a steering wheel or a control surface. The vehicles are preferably vehicles that are controlled in a flowing medium, for example aircraft or water craft. In particular, the present invention relates to the control of helicopters.

The device comprises a trim point that determines a preferred direction of movement of the vehicle in a neutral position of the manual control unit. This neutral position of the manual control unit is generally characterised in that in it no forces act on the manual control unit. In other words neither the pilot nor the autopilot needs to apply any forces in order to keep the manual control unit in its neutral position. Since, generally speaking, breakout forces need to be overcome in order to move the manual control unit from its neutral position, the neutral position of the manual control unit is also characterised in that in it forces act that are smaller than the entire breakout forces of the control system.

By determining a trim point it becomes possible to adapt control of the vehicle to particular flow conditions. In particular in the case of aircraft a situation can thus be brought about which brings to zero the control forces that are needed for a stable flight situation and/or for a preferred direction of movement, which control forces need to be applied by the pilot or by an autopilot. Consequently, the pilot or the autopilot only needs to apply forces when the stable flight situation or the preferred movement direction is to be quit. The forces to be applied generally comprise frictional forces of the entire control system and any additional breakout forces and artificial force gradients.

Furthermore, the device comprises means for generating return forces that act in the direction of the neutral position of the manual control unit. These means for generating return forces comprise, for example, elastic elements such as pretensioned return springs, or hydraulic devices that are provided in order to move the manual control unit to its neutral position and to hold it in this position. Furthermore, the return forces can also be caused directly by the trimmed control surfaces or rudders themselves. However, these return forces are generally reduced or completely eliminated by a servo device. Such a servo device is usually arranged upstream of a control surface or rudder or some other means for controlling the direction of movement so as to amplify the control input of a pilot or of an autopilot and in this way to apply the frequently very considerable forces for displacement of the control surfaces or rudders.

It is necessary to make a distinction between return forces that act in the direction of the neutral position of the manual control unit, and breakout forces that need to be applied in order to move the manual control unit from its neutral position. The totality of breakout forces can, for example, comprise mechanical frictional forces within the control device and additional artificial breakout forces of a return spring. The return forces of the device then comprise the return forces of this return spring.

The device further comprises a trim coupling which when operated makes it possible to reduce the forces acting on the manual control unit, which forces are to be applied in order to displace the manual control unit from the neutral position. A control device could, for example, be designed such that by means of a return spring artificial breakout forces acting on the manual control unit are generated. One end of this return spring is then connected to the manual control unit, while the other end is affixed. Reduction of the forces acting on the manual control unit can then, for example, be achieved in that the trim coupling is located between the return spring and the fastening so that when the trim coupling is operated the return spring is functionally decoupled from the manual control unit and in this way the forces are reduced by the forces caused by the return spring.

Finally, the device comprises a trim control unit which stores the trim point which existed prior to operation of the trim coupling, and, for example in a first mode, makes it possible to retain or restore this trim point even after renewed coupling of the trim coupling. Such a device makes it possible for a pilot both to carry out manual control with reduced control forces, and to cause the trim point to be retained.

In a further embodiment the device comprises a second operating mode in which when the trim coupling is operated the trim point is set anew. This second mode makes it possible to manually control the vehicle at reduced forces which act in the direction of the neutral position of the manual control unit, and at the same time to set a new trim point. This can, for example, be required if there has been a change in the flow conditions or in the desired direction of movement.

The two modes of the device can be selected by the pilot and can, for example, in each case be activated by single-clicking or double-clicking a switch on the manual control unit. However, other activation options of the modes are also imaginable, e.g. the use of toggle switches or of two separate switches. Furthermore, it is imaginable for the trim control unit to basically always store the trim point when the trim coupling is operated, and for the pilot to be able to decide only during coupling of the trim coupling as to whether the original trim point is to be restored or whether a new trim point is to be set.

According to a further aspect of the invention, the device comprises means for controlling the direction of movement, in particular the vertical rudder, elevator, or control surface. In the case of helicopters the means for controlling the direction of movement may involve the rotors and the swashplate of the helicopter, which direction of movement has an influence on the angle of incidence of the rotor.

In a further embodiment the device further comprises a final control element which, either directly or indirectly by way of the manual control unit, acts on the means for controlling the direction of movement. A final control element can, for example, be a trim motor or a final control motor whose one end is connected to the trim coupling and whose other end is affixed. It is then possible to set the trim point by way of the trim motor. This arrangement can involve a stepper motor which is selected by way of a trackpoint, a trackball or generally a direction-dependent switch so that the trim point can be set as accurately as possible.

If a final control element, and in particular a trim motor, is used, the first mode of the device can be implemented in that the trim control unit stores the setting information of the trim motor prior to operation of the trim coupling. Such setting information can, for example, be information relating to the local coordinates of the neutral position and/or relating to the settings of the trim motor in this neutral position. After coupling of the trim coupling the original trim point can then be maintained or restored in that this stored setting information is reset by way of the trim motor.

According to a further aspect of the invention, the device comprises a control range in which the trim point can be set. This control range generally corresponds to the range within which the means for controlling the movement direction can be influenced by the displacement of the manual control unit.

Furthermore, the device can comprise an autopilot. The latter can, for example, by means of the trim motor act on the means for controlling the direction of movement. Furthermore, between the manual control unit and the means for controlling the direction of movement the device can comprise a so-called SAS (Stability Augmented System)/SEMA (Smart Electromechanical Actuator) actuator which carries out short-term stabilisation functions and is also controlled by the autopilot. This SAS/SEMA actuator then supplements control by way of the trim motor, which control is responsible for overarching control of the direction and movement, thus making it possible to carry out stabilising measures, for example compensating reactions to wind gusts or waves.

The influence the autopilot has on the direction of movement of the vehicle can be reduced by operating the trim coupling or by operating the manual control unit. For example, by way of operating the trim coupling, the autopilot can be decoupled completely from controlling the direction of movement, i.e. it can be completely degraded. However, it is also possible for the autopilot to be only partly degraded and to continue to be able to act to a reduced extent on the direction of movement of the vehicle. In particular, the autopilot can continue to act on stabilising the vehicle, and in this way it can, for example, react in a compensating manner to any wind gusts or waves. This can be made possible by means of the SAS/SEMA actuator, because, unlike the trim motor, the SAS/SEMA actuator is not decoupled by decoupling the trim coupling from the control system. The autopilot is thus only partly degraded by operation of the trim coupling and can continue to carry out stabilising measures by way of the SAS/SEMA actuator.

As already explained, forces that act in the direction of the neutral position of the manual control unit can be generated by a return element between the manual control unit and the trim coupling. These forces can comprise a constant breakout force for initial displacement of the manual control unit and a force gradient with increasing displacement of the manual control unit. The forces with which an autopilot that is coupled-in by way of the trim coupling can act on the means for controlling the movement direction of the vehicle are generally limited by the breakout forces of this return element.

BRIEF DESCRIPTION OF THE DRAWINGS

Below, the invention is described in more detail with reference to an exemplary embodiment. The following are shown.

DETAILED DESCRIPTION

Figure 1:
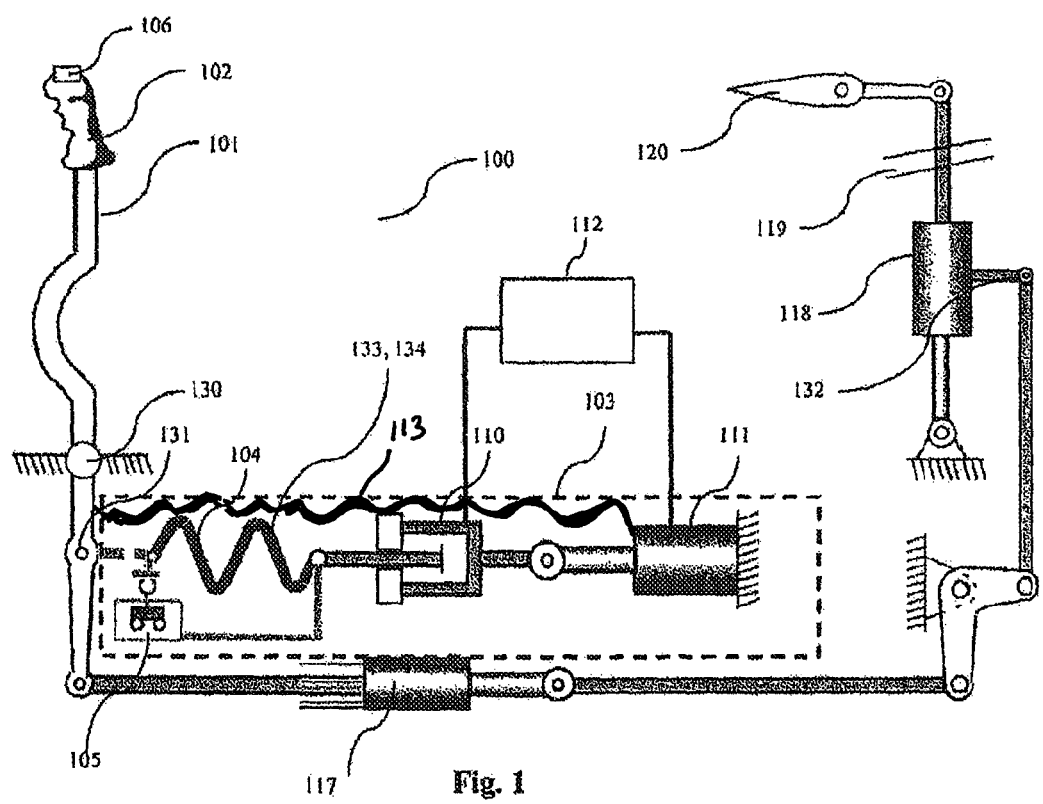
FIG. 1 shows an exemplary embodiment of the control system of a helicopter.

FIG. 1 shows an exemplary embodiment of the control system 100 of a helicopter. The control stick 101 comprises a handle 102 on which a switch 106 for operation of a trim coupling 110 is affixed. By way of the control stick 101, by means of mechanical connections such as, for example, control rods, the pilot can manually move a rotor 120 by way of a swashplate 119. The use of fly-by-wire systems is also imaginable, in which while mechanical control takes place using a control stick 101, by way of displacement of the control stick 101 the information is however electrically or optically transmitted to the swashplate 119. Displacement of the swashplate 119 and of the rotor 120 is then effected by digitally controlled final control motors (not shown).

In the present mechanical control system the control system 100 comprises a servo device 118 for increasing the force acting on the control stick 101. This servo device 118 can be designed to operate hydraulically and/or electrically (electromechanically or electrohydraulically). Furthermore, it can be advantageous if the extent of the force assistance of the servo device 118 depends on the speed of the vehicle or on the forces acting on the rotor 120.

The control system 100 can furthermore comprise an SAS (Stability Augmentation System)/SEMA (Smart Electromechanical Actuator) actuator 117 that is used to compensate for any fast and possibly jerky control movements of the pilot in that such movement are transferred to the rotor 120 only in a limited manner. Furthermore, by using such an actuator 117, incorrect control due to wind gusts and buffeting can be compensated for. On the other hand it is also possible to carry out short-term fast control intervention automatically, for example by means of the autopilot, which control intervention can, for example, serve to stabilise the helicopter.

Apart from the mechanical connection to the rotor 120 the control stick 101 is also connected in parallel to a trim actuator 103 which generates the "artificial feeling of force" with breakout forces and an optional force gradient, and which furthermore makes possible the control by way of an autopilot. The trim actuator 103 comprises a return spring 104 which generates an artificial breakout force and the force gradient. One end of the return spring 104 is connected to the control stick 101, while the other end is coupled, by way of the trim coupling 110, to a final control element 111, e.g. to a trim motor. In the coupled state it thus becomes necessary for the pilot to overcome the breakout forces and the force gradient of the return spring 104 in order to cause manual control of the rotor 120. In this way the return spring 104 generates an "artificial feeling of force" for ergonomic control by the pilot. Furthermore, a degree of robustness to incorrect intervention, e.g. resulting from the pilot accidentally bumping against the control stick 101, is ensured.

On the other hand, by way of moving the trim motor 111 in the coupled state an autopilot can cause automatic control of the rotor 120. In this arrangement the forces which can act on the control system by the trim motor 111 are limited by the breakout forces of the return spring 104. Furthermore, in the coupled state the trim point, which represents the home position of the control stick 101 in the absence of any forces acting on it, can be set by way of setting and fixing the trim motor 111. By means of an additional toggle switch or track point the pilot can change the setting of the trim motor 111 and can thus adjust the trim point.

The trim coupling 110 is designed such that in the decoupled state it allows complete decoupling of the return spring 104 and the trim motor 111 so that the control stick 101 can be moved without the return forces of the spring 104. Furthermore, by means of the decoupling from the trim motor 111 at least partial degradation of the autopilot is implemented.

In order to provide the pilot with an "artificial feeling of force" also in the decoupled state with manual control, a second return spring 113 can be installed between the trim motor 111 and the control stick 101, which second return spring is not decoupled by the trim coupling 110. In the decoupled state the breakout forces caused by friction in the control system and the artificial forces of the return spring 104 also as in addition.

In order to ensure early and reliable detection of any manual intervention by the pilot the exemplary embodiment shown comprises a pressure sensor 105 that represents a threshold value switch for pilot intervention. The pressure sensor 105 registers any effect on the control stick 101, e.g. when overcoming the breakout forces, and in this way can initiate degradation of the autopilot even without decoupling of the trim coupling 110. Degradation of the autopilot with coupled trim coupling 110 can, for example, mean that while the actual control of the helicopter takes place manually, the autopilot, however, continues to carry out stabilising control measures, for example by way of an SAS/SEMA actuator.

Apart from pressure detectors 105 other indication options are also imaginable, e.g. displacement of the trim spring or the return spring which might detect manual intervention by the pilot.

Finally, the control system 100 comprises a trim control unit 112 which stores the trim point of the control system 100. This makes it possible for a pilot to automatically restore the stored trim point even after operation of the trim coupling 110 and/or after changing the setting of the trim motor 111. Depending on the embodiment, the trim control unit 112 can continuously and at each point in time store the actual trim point. However, it is also possible for storage of the trim point to take place only when instructed by the pilot.

FIG. 1 furthermore illustrates the various forces that need to be overcome during manual control of the rotor 120 by way of the control stick 101. On the various joints between the control rods of the mechanical connection between the control stick 101 and the rotor 120, in particular, frictional forces occur, for example the frictional force 130 of the mechanical aircraft control system, the frictional force 131 of the trim actuator 103, and the frictional force 132 at the transition to the servo device 118. These frictional forces 130-132, and any breakout forces and force gradients of a second return spring, need to be overcome by the pilot also in the case of a decoupled trim coupling 110. Furthermore, in the case of a coupled trim coupling 110 the breakout forces 133 and the force gradient 134 of the return spring 104 also come into effect.

Figure 2:
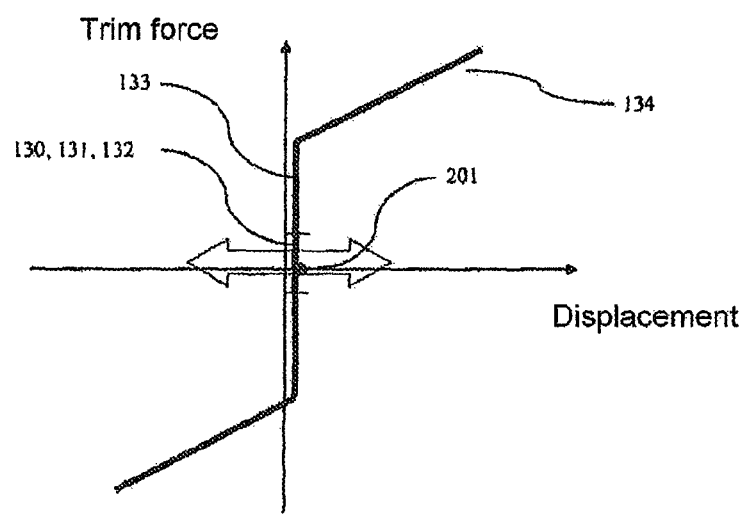
FIG. 2 shows the forces that need to be overcome with manual control.

FIG. 2 shows these trim forces depending on the excursion of the control stick 101. In the absence of any forces the rotor 120 and the control stick 101 are situated in the trim point 201. In order to effect a first displacement of the control stick 101 from this trim point 201 both the frictional forces 130-132 and the breakout force 133 of the return spring 104 need to be overcome. For further displacement the additional forces according to the force gradient 134 of the return spring 104 also need to be overcome. The totality of forces to be overcome thus increases with an increase in the displacement of the control stick 101.

TABLE 1

| | Manual pilot control with coupled trim coupling | Manual pilot control with decoupled trim coupling | Control by SAS/ SEMA actuator | Control by trim motor |
|---|---|---|---|---|
| Frictional forces of the mechanical flight control system | + | + | 0 | + |
| Frictional forces at the transition to the servo device | + | + | + | + |
| Breakout force + force gradient of the return spring | + | 0 | 0 | − |
| Frictional forces of the trim actuator | + | + | 0 | + |

Table 1 shows the forces that need to be overcome in various situations by various control devices, e.g. by the manual control unit, the autopilot or the SAS/SEMA actuator, or which forces act on these control devices. In the table "+" denotes that these forces have to be overcome by the control device for displacement of the means for controlling the direction of movement; "0" denotes that these forces do not play any part; and "−" denotes that this force must not be exceeded.

Table 1 shows that with manual pilot control with coupled trim coupling 110 all the forces must be overcome by the pilot. As already explained, with the trim coupling 110 decoupled, the forces of the return spring 104 no longer apply. For its stabilising control measures the SAS/SEMA actuator only needs to overcome the frictional forces 132 at the transition to the servo device, wherein the trim motor 111 for the control system needs to overcome the frictional forces 131-132, but at the same time must not exceed the breakout forces 133 of the return spring 104.

In a first operating mode, e.g. the operating mode 'Pilot', the device 100 with decoupled coupling comprises a moderate feeling of force, which, as described above, by means of a second return spring can comprise an ergonomically optimised, moderate artificial feeling of force. This provides the pilot with precise and agreeable control of the helicopter. In contrast to this, the control system 100 according to the invention in a second operating mode, e.g. the operating mode 'AFCS' with coupled coupling, provides a significantly greater artificial feeling of force, which is, however, still controllable by the pilot, in order to in this way provide the autopilot with a greater range of forces for intervention in the control of the aircraft.

Switching between the two operating modes can preferably take place in the AFCS computer, which as a rule is able to drive the trim coupling 110. In one embodiment switching between the two operating modes replaces the function of "trim coupling" which is known from prior art, which made it possible to change the trim point 201 with concurrent control input.

In another exemplary embodiment, the introduction of an additional "double-click" function of the trim coupling 110 in the switch 106 of the handle 102 of the control stick 101 ensures that the AFCS computer returns the control to the original trim point 201 after the pilot lets go of the switch. This original trim point 201 can, for example, be derived from the trim control unit 112.

In one embodiment the trim motor 111 can be decoupled by a "single click" on the switch 106 on the handle 102 of the control stick 101 so that the pilot, as has hitherto been the case, can carry out manual precise control of the rotor 120. As explained above, in this case only modest breakout forces, which are caused by the frictional forces 130-132 and by any return forces of a second return spring, need to be overcome. Furthermore, with this function a new trim point 201 can be set. In contrast to this, by means of a "double click" on the switch 106 on the handle 102 of the control stick 101 it can be ensured that after termination of the manual control the trim point 201 that existed prior to decoupling the trim motor 111 is automatically restored. This can be implemented in that prior to decoupling the trim motor 111 the then existing trim point 201 is stored by the trim control unit 112, which after completion of manual control ensures that the trim motor 111 is set so that the stored trim point 201 is restored.

In an exemplary embodiment the pilot could cause the trim coupling 110 to be opened by "double-clicking" a key button or a switch on the control stick 101. With the key button depressed, the pilot could then in a smooth operating control mode carry out correcting control movements. By the pilot letting go of the key button the trim coupling 110 would close and the control system would, possibly with a time delay, by means of the trim motor 111 be returned to the trim point 201 stored in the trim control unit 112. In contrast to this, with a "single click" of the key button no return to the trim point 201 would take place.

The device described makes it possible for the pilot to carry out intended fine control of the rotor 120 against modest breakout forces. This is implemented by decoupling the trim motor 111 in the operating mode "Pilot", which is, for example, activated by means of a "single click" on the trim coupling switch. Furthermore, in a second operating mode "AFCS" the breakout forces of the return spring 104 can be increased in order to in this way provide a wider range of forces to the autopilot. In this way it is also possible to increase the threshold value of the pressure sensor 105, at which value manual intervention by the pilot is detected during short-term or emergency situations, so that the probability of erroneous detection, for example resulting from the pilot accidentally bumping against the control stick 101, or resulting from vibration of the helicopter, can be reduced. Overall this provides increased robustness to unintended degradation of the autopilot.

Furthermore, by introducing a "double-click" function of the trim coupling 110 the pilot is provided with the option of carrying out manual control with modest breakout forces while nevertheless retaining the original trim point 201.

LIST OF REFERENCE CHARACTERS

100 Control system of a helicopter
101 Manual control unit/control stick
102 Handle
103 Trim actuator
104 Return element
105 Pressure sensor
106 Switch
110 Trim coupling
111 Final control element/trim motor
112 Trim control unit
117 SAS/SEMA actuator
118 Servo device
119 Swashplate
120 Rotor
130 Frictional force of the mechanical control of the aircraft
131 Frictional force of the trim actuator
132 Frictional force at the transition to the servo device
133 Breakout force of the return spring
134 Force gradient of the return spring
201 Trim point

What is claimed is:

1. A device for controlling helicopters comprising:
   a manual control unit configured to influence the direction of movement of a helicopter, the manual control unit providing, in a neutral position of the manual control unit, a trim point to determine a preferred direction of movement;
   a force generating device, generating at least one force acting in the direction of the neutral position of the manual control unit;
   a trim coupling operable to reduce the at least one force acting on the manual control unit by means of a return spring, the return spring having a first end connected with the manual control unit and a second fixed end connected to the trim coupling;
   a trim motor connected to the trim coupling so that the trim coupling is located between the first return spring and the trim motor;
   a second return spring connecting the manual control unit with the trim motor; and
   a trim control unit configured to store and retain the trim point existing prior to an operation of the trim coupling.

2. The device as recited in claim 1, wherein, when the device is in a first operating mode, a coupling of the trim coupling results in a restoration of the retained trim point.

3. The device as recited in claim 1, wherein the device defines a control range in which the trim point can be set.

4. The device as recited in claim 2, wherein when the device is in a second operating mode, the trim coupling is operable to set a new trim point.

5. The device as recited in claim 1, further comprising a control device configured to control a direction of movement of the helicopter, wherein the control device includes a rotor of a helicopter.

6. The device as recited in claim 5, wherein the trim motor is configured to act on the control device, and wherein the trim motor is configured to act on the manual control unit using the trim coupling.

7. The device as recited in claim 6, wherein the trim motor is operable to set the trim point.

8. The device as recited in claim 7, further comprising an autopilot system configured to influence the direction of movement of the helicopter independently from the manual control unit.

9. The device as recited in claim 8, wherein the autopilot system is configured to act on the control device using the trim motor.

10. The device as recited in claim 9, wherein an operation of one of the trim coupling and the manual control unit reduces an influence of the autopilot system on the direction of movement.

11. The device as recited in claim 1, wherein the force generating unit includes a return element disposed between the manual control unit and the trim coupling.

12. The device as recited in claim 11, wherein the autopilot system is configured to act on the return element so as to control a direction of movement of the helicopter.

13. The device as recited in claim 11, wherein the at least one return force includes a breakout force for initial displacement of the manual control unit and a force gradient corresponding to increasing displacement of the manual control unit.

14. The device as recited in claim 13, wherein the return element includes a spring.

15. The device as recited in claim 4, wherein the manual control unit includes a switch configured to operate the trim coupling, wherein the first and the second operating modes can be activated by a single click or double click on the switch.

16. A device for controlling a helicopter comprising:
   a manual control unit configured to influence the direction of movement of a helicopter, the manual control unit providing, in a neutral position of the manual control unit, a trim point to determine a preferred direction of movement;
   a force generating device, generating at least one force acting in the direction of
   the neutral position of the manual control unit;
   a trim coupling operable to reduce the at least one force acting on the manual control unit by a return spring, the return spring having a first end connected with the manual control unit and a second fixed end connected to the trim coupling;
   a trim motor connected to the trim coupling so that the trim coupling is located
   between the return spring and the trim motor, the trim coupling being capable of selectively
   coupling and decoupling the return spring from the trim motor during operation; and
   a trim control unit configured to store and retain the trim point existing prior to an
   operation of the trim coupling.

17. The device as recited in claim 1, further comprising a stability augmentation system/smart electromechanical system to compensate for fast and jerky control movement of a pilot to a rotor of a helicopter.

18. The device as recited in claim 1, wherein the second end is fixed to the trim coupling.

19. A helicopter comprising:
   a rotor; and
   a device for controlling the rotor, the device comprising:
      a manual control unit configured to influence the direction of movement of the helicopter, the manual control unit having, in a neutral position of the manual control unit, a trim point to determine a preferred direction of movement;
      a force generating device, generating at least one force acting in the direction of the neutral position of the manual control unit;
      a trim motor;
      a trim coupling having a first return spring operable to reduce the at least one force acting on the manual control unit, the first return spring having a first end connected with the manual control unit and a second end connected to the trim coupling;
      the trim motor being connected to the trim coupling so that the trim coupling is located between the first return spring and the trim motor;
      a second return spring connecting the manual control with the trim motor;
      a trim control unit configured to store and retain the trim point existing prior to an operation of the trim coupling; and
      a stability augmentation system/smart electromechanical system to compensate for fast and jerky control movement of the pilot to the rotor.

20. The device as recited in claim 16, further comprising a stability augmentation system/smart electromechanical system to compensate for fast and jerky control movement of a pilot to a rotor of a helicopter.

* * * * *